Patented Dec. 12, 1939

2,183,087

UNITED STATES PATENT OFFICE 2,183,087

TRISAZO DYESTUFFS AND THEIR MANUFACTURE

Emil Senn, Riehen, near Basel, Switzerland, assignor to the firm of J. R. Geigy A. G., Basel, Switzerland No Drawing. Application June 14, 1938, Serial No. 213,683. In Switzerland July 1, 1937

7 Claims. (Cl. 260—171)

This invention relates to the manufacture of black trisazo dyestuffs and has for its object the production of valuable trisazo dyestuffs that are especially suitable for dyeing leather, and which have a very good resistance to acid, facilitating their use by the acid brush-dyeing method.

According to the present invention black trisazo dyestuffs are produced by first coupling in acid solution 1 molecule of tetrazotized benzidine with 1 molecule of a peri-amino-naphthol sulphonic acid, then allowing a diazo compound of the benzene or naphthalene series containing sulphonic acid groups to act on the diazo-azo-compound in an alkaline medium, and finally coupling in acetic acid medium the intermediate compound with the sulphuric acid ester of a 2:4-diamino-phenol-hydroxyalkyleneether of the formula

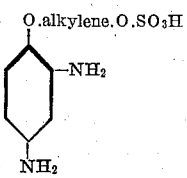

For use in this process the following substances may be particularly mentioned:

As peri-amino-naphthol sulphonic acid, the chief item is the 1:8-aminonaphthol-3:6-disulphonic acid; and as amino sulphonic acids of the benzene and naphthalene series, especially sulphanilic acid, but also o-amino-benzene sulphonic acid, p-nitraniline-o-sulphonic acid, m-nitraniline-o-sulphonic acid, p-nitraniline-m-sulphonic acid, chloraniline sulphonic acids, metanilic acid, 2-amino-4-sulpho-benzoic acid, 3-amino-5-sulpho-2-hydroxy-benzoic acid, naphthionic acid and 2-aminonaphthalene-8-sulphonic acid may be used.

The following example illustrates the invention.

3/10 molecule (in kg.) of the intermediate compound produced in known manner from 1 molecule of tetrazotized benzidine→1 molecule of 1:8-amino-naphthol-3:6-disulphonic acid (coupled acid)←1 molecule of p-diazo-benzene sulphonic acid (coupled soda alkaline) are coupled in acetic acid medium ice-cold with 74.4 kg. of the sulphuric acid ester of 2:4-diamino-phenol-hydroxyethylether. After stirring for a long time the diazo reaction has disappeared, then steam is blown in and salting out is effected at 50° C. with about ⅕ of the volume of common salt.

The separated dyestuff is filtered and dried. It constitutes a dark powder which dissolves with a violet-black color in water and with a blue color in concentrated sulphuric acid. It is excellently suitable for dyeing leather black, especially calf velour leather by the method of acid brush dyeing. The bloomy shades obtained have the advantage of not losing their color intensity when being wheeled.

If in the above example another peri-amino-naphthol sulphonic acid, such as 1:8-amino-naphthol-4-mono- or -4:6-disulphonic acid, is used instead of the 1:8-amino-naphthol-3:6-disulphonic acid and one of the other above mentioned amino-benzene sulphonic acids is used instead of the sulphonilic acid, black dyestuffs with quite similar properties are produced. Instead of the sulphuric acid ester of the hydroxyethylether of 2:4-diaminophenol, similar compounds containing the hydroxypropyl radical -$CH_2.CH_2$-$CH_2$-OH or the dihydroxypropyl radical -$CH_2.CHOH.CH_2OH$ may be used.

2:4 diaminophenol-hydroxyalkylene-ether-sulphate may be prepared according to the method disclosed in United States Patent No. 1,644,524.

What I claim is:

1. Trisazo dyestuffs corresponding in the free state to the following formula

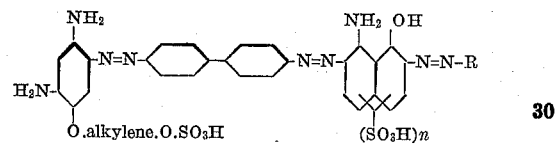

wherein R represents the radical of a sulphonated diazotizable amine selected from the group consisting of sulphonated diazotizable amines of the benzene and naphthalene series, n being 1 to 2, and alkylene meaning a lower alkylene radical, being dark powders soluble in water with green- to violet-black colors, being excellently suitable for dyeing leather black, especially calf velour leather by the method of acid brushing dyeing.

2. Trisazo dyestuffs corresponding in the free state to the following formula wherein R represents the radical of a sulphonated diazotizable amine selected from the group consisting of sulphonated diazotizable amines of the benzene and naphthalene series, being dark powders soluble in water with green- to violet-black colors, being excellently suitable for dyeing leather black, especially calf velour leather by the method of acid brushing dyeing.

3. Trisazo dyestuffs corresponding in the free state to the following formula

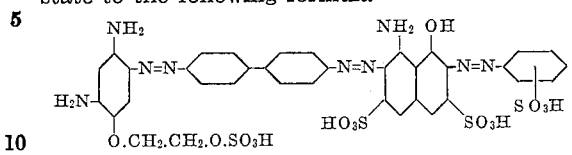

being dark powders soluble in water with green- to violet-black colors, excellently suitable for dyeing leather black, especially calf velour by the method of acid brushing dyeing.

4. The trisazo dyestuff corresponding in the free state to the following formula

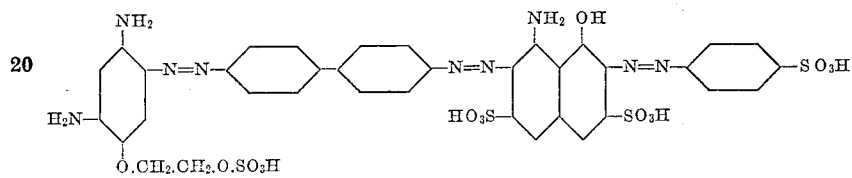

being a dark powder which dissolves with a violet-black color in water and with a blue color in concentrated sulphuric acid, being excellently suitable for dyeing leather black, especially calf velour leather by the method of acid brushing dyeing.

5. The trisazo dyestuff corresponding in the free state to the following formula

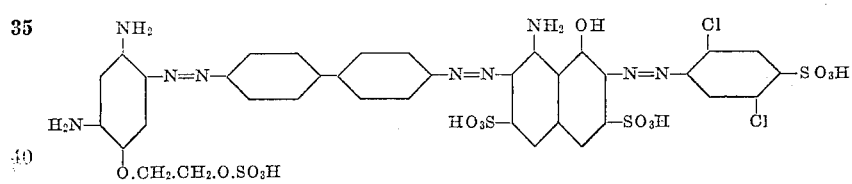

being a dark powder which dissolves with a violet-black color in water, being excellently suitable for dyeing leather black, especially calf velour leather by the method of acid brushing dyeing.

6. The trisazo dyestuff corresponding in the free state to the following formula

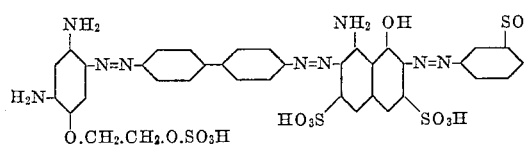

being a dark powder which dissolves with a violet-black color in water, being excellently suitable for dyeing leather black, especially calf velour leather by the method of acid brushing dyeing.

7. A process for the preparation of trisazo dyestuffs consisting in tetrazotizing 1 molecule of benzidine, coupling in acid medium with 1 molecule of a peri-aminonaphthol sulphonic acid, coupling soda alkaline with the thus obtained intermediate product 1 molecule of a diazotized aminosulphonic acid of the benzene and naphthalene series and coupling finally the diazodisazodyestuff obtained in acetic acid medium with 1 molecule of a sulphuric acid ester of a 2:4-diaminophenol-hydroxyalkylenether.

EMIL SENN.